(12) United States Patent
Pickering et al.

(10) Patent No.: US 6,811,758 B1
(45) Date of Patent: Nov. 2, 2004

(54) PRECIPITATION PROCESS

(75) Inventors: Stephen Pickering, La Hulpe (BE); Boro Djuricic, Moedling (AT)

(73) Assignee: European Community, Represented by the Commision of the European Communities, Luxembourg (LU)

( * ) Notice: Subject to any disclaimer, the term of this patent is extended or adjusted under 35 U.S.C. 154(b) by 0 days.

(21) Appl. No.: 09/926,018

(22) PCT Filed: Feb. 15, 2000

(86) PCT No.: PCT/GB00/00513

§ 371 (c)(1),
(2), (4) Date: Nov. 15, 2001

(87) PCT Pub. No.: WO00/48939

PCT Pub. Date: Aug. 24, 2000

(30) Foreign Application Priority Data

Feb. 16, 1999 (GB) .............................................. 9903519

(51) Int. Cl.$^7$ ........................... C01F 17/00; B01J 37/00
(52) U.S. Cl. ..................... 423/21.1; 423/142; 502/300; 502/304; 502/338
(58) Field of Search ............................ 423/21.1, 142; 502/300, 304, 338

(56) References Cited

U.S. PATENT DOCUMENTS

| | | | | |
|---|---|---|---|---|
| 4,904,638 A | * | 2/1990 | DiCarolis .................... 505/510 |
| 5,064,791 A | | 11/1991 | Ohtsuka et al. | |
| 5,352,269 A | * | 10/1994 | McCandlish et al. .......... 75/351 |
| 5,744,118 A | * | 4/1998 | Imamura et al. ............. 423/263 |
| 5,851,507 A | * | 12/1998 | Pirzada et al. ............... 423/659 |
| 5,938,837 A | * | 8/1999 | Hanawa et al. ................ 117/68 |
| 5,962,343 A | * | 10/1999 | Kasai et al. ................. 438/693 |
| 6,171,572 B1 | * | 1/2001 | Aozasa .................. 423/594.12 |
| 6,254,940 B1 | * | 7/2001 | Pratsinis et al. ............. 427/562 |
| 6,350,543 B2 | * | 2/2002 | Yang et al. .................. 429/224 |

FOREIGN PATENT DOCUMENTS

WO WO 95 03252 A 2/1995
WO 0 712 175 A 5/1996

OTHER PUBLICATIONS

US 2002/0120016 A1 09/397,814 Hu Sep. 17, 1999.*
Patent Abstracts of Japan, Mar. 18, 1991, & JP 03 005324 A, Kawasaki Steel Corp. Jan. 11, 1991.
Patent Abstracts of Japan, Jun. 30, 1987, & JP 62 027310 A, Tokuyama Soda Co Ltd., Feb. 5, 1987.
Patent Abstracts of Japan, Aug. 11, 1987, & JP 62 052129 A, Tokuyama Soda Co Ltd., Mar. 6, 1987.

* cited by examiner

Primary Examiner—Steven Bos
Assistant Examiner—William G. Wright, Sr.
(74) Attorney, Agent, or Firm—Bacon & Thomas

(57) ABSTRACT

The present invention relates to a process for inducing homogeneous precipitation of a metal oxide, wherein said metal is capable of existing in at least two cationic oxidation states, which process comprises the steps of: i) providing an aqueous solution of a metal in a lower cationic oxidation state; and ii) adding an oxidant capable of oxidising said metal to a higher cationic oxidation state under conditions such that the mixing of said aqueous solution and said oxidant is substantially complete before precipitation of an oxide of said metal in its higher oxidation state occurs.

24 Claims, 7 Drawing Sheets

PRECIPITATION PROCESS

Figure 1:
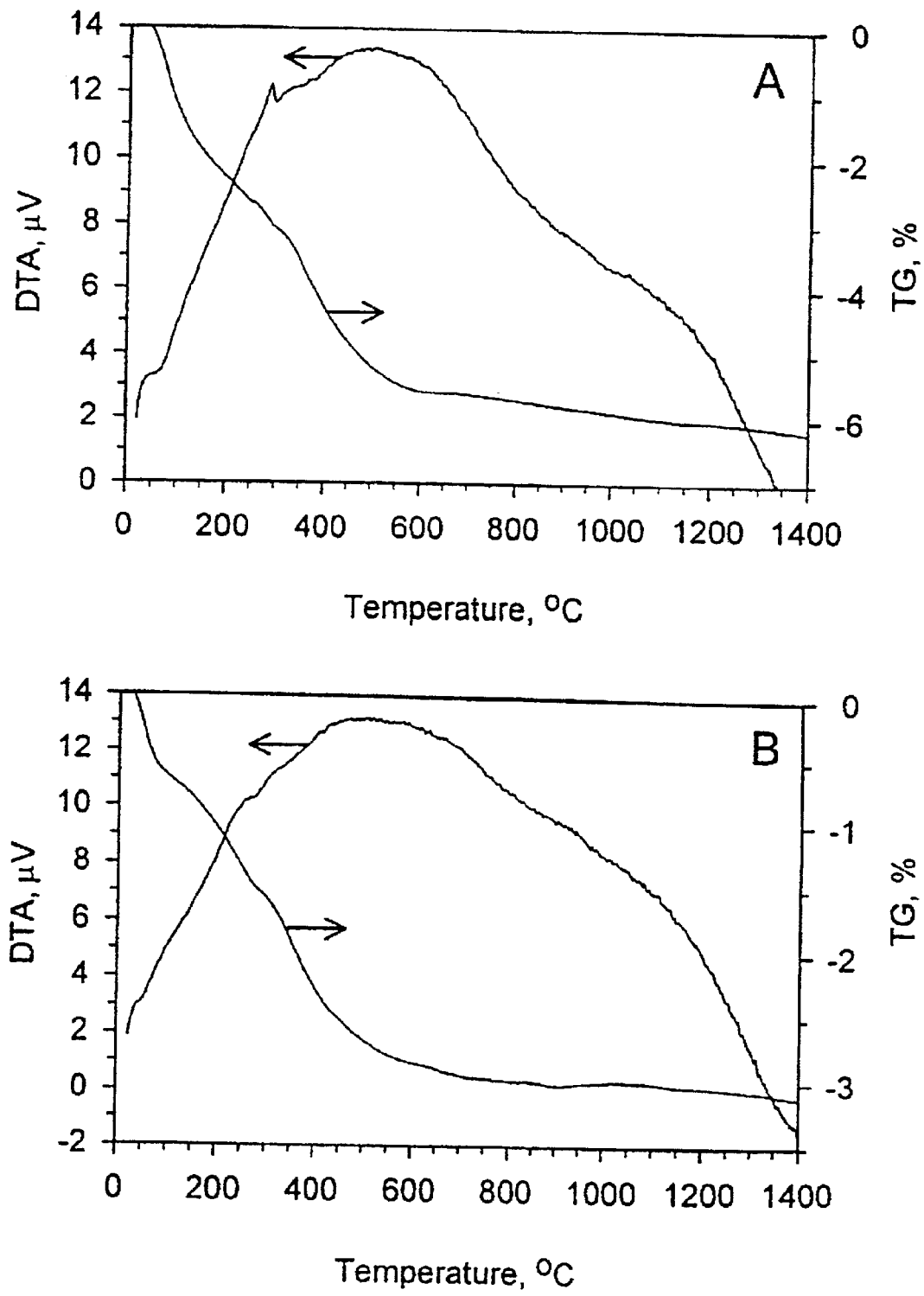

The present invention is concerned with a process for inducing homogeneous precipitation of metal oxides and with the application of such a process to the preparation of weakly agglomerated nanacrystalline powders of said metal oxides.

In the present specification the term metal oxides is intended to include hydroxides, hydrated oxides, oxohydroxides, or oxoperoxohydroxides of metals.

The increased mechanical performance demanded of advanced ceramic materials imposes increasingly stricter requirements on the ceramic powders from which they are made. The use of monodisperse nanocrystalline powders as starting materials has demonstrated considerable potential for improving the functional properties of existing ceramic compositions. For example, the use of monodisperse nanocrystalline powders as starting materials provides ceramic compositions with finer porosity (e.g. for use in ceramic filters), and greater surface area (e.g. for use in catalysts). Such materials are also capable of forming better thin ceramic coatings.

In the present specification the term "nanocrystalline powder" is intended to mean a powder wherein substantially all of the constituent particles have a crystal size of less than 100 nm.

The term "weakly agglomerated powder" is intended to mean a powder containing agglomerates that break up during normal processing or forming operations.

The term "monodisperse powder" is intended to mean a powder whose particle size distribution has a geometric standard deviation, $\sigma_g$, less than or equal to 1.1. For many conventional powders $\sigma_g$ would be in the range of from 1.8 to 2.2.

Cerium (IV) oxide, $CeO_2$, is an example of a material where the number of applications has increased rapidly, for example in glasses, phosphors, catalysis, and chemical applications, and for which the use of nanocrystalline powders is an important factor. Unfortunately, the high specific surface areas of nanocrystalline powders, in which the primary particle size is often smaller than 5 nm, also results in a stronger tendency of the powder to agglomerate which can make processing difficult. In the present specification the term "primary particle" distinguishes the small individual particles (typically less than 5 nm in diameter) that are formed in the first stage of the homogeneous precipitation process from the larger agglomerates of such particles (typically 50–100 nm in diameter) that may form later. These large spherical agglomerates are referred to as "secondary particles" and may contain hundreds of primary particles. Weakly-agglomerated powder is needed both for dry processing methods, for example powder compaction, and for the preparation of stable suspensions in liquids, for example for thin or thick film production. Unless weakly-agglomerated nanoscale powders can be produced, the benefits expected from highly-uniform nanocrystalline powders are easily lost during the manufacture of components. The strength of agglomerates depends on the surface properties of the nanocrystalline particles in the powder and these properties are sensitively dependent on the powder synthesis procedures.

Precipitation from aqueous metal salt solution is widely used in industry for producing ceramic oxide powders, but for nanocrystalline materials, such powders tend to form excessively hard agglomerates. The precipitated species is usually a precursor, for example a hydroxide, rather than the required oxide and a thermal decomposition treatment is needed to obtain the final product. In densely agglomerated nanostructured powders there are many points of contact between primary particles and even a low-temperature thermal decomposition treatment allows sufficient diffusion to occur to produce agglomerates too hard to be easily redispersed. Dense agglomerates must therefore be avoided during the precipitation process if easily processable powders are to be obtained. Control of agglomerate morphology requires control of the chemistry of the precipitation reaction.

Precipitation occurs by adding a precipitating ligand (anion) to a solution containing cations of the appropriate metal. If the precipitating ligand is added,directly by simply pouring one solution into another then there is little control of the chemistry during precipitation because of the large and inhomogeneous gradients in solution concentration. A better control of chemical and morphological characteristics can be achieved if the precipitating ligands are generated "in situ", simultaneously and uniformly throughout the solution, this results in what is known as a "homogeneous" precipitation process.

A homogeneous precipitation process based on forced hydrolysis is quite widely applicable and has been used to produce various monodisperse metal oxide precursor particles of various shapes and sizes [see MATIJEVIC, in High Tech Ceramics, edited by P. Vincenzini, (Elsevier, Amsterdam, 1987) p. 441–4583]. Forced hydrolysis is usually accomplished either by increasing the pH of the solution, or by heating the solution, in some cases at temperatures up to boiling point at atmospheric pressure, but more usually to higher temperatures under pressure, i.e. hydrothermal treatment.

In the present specification, the term "hydrothermal treatment" of a substrate means heating said substrate in the presence of water at a temperature above the normal boiling point of the water under applied or autogenous pressure sufficient to prevent boiling of the water.

Homogeneous precipitation by an increase in the pH of the solution can be achieved by the thermal decomposition of urea or hexamethylenetetramine to form ammonia thereby generating OH as the precipitating ligand [see MATIJEVIC, in High Tech Ceramics, edited by P. Vincenzini, (Elsevier, Amsterdam, 1987) p. 441–458]. Monodispersity of the precipitated particle results from the occurrence of nucleation in a single burst followed by a uniform growth process, for example according to the LaMer theory. The primary particles resulting from such a nucleation process are usually monodisperse and several nanometers in size. Amorphous precipitates such as aluminium hydroxide usually consist of spherical particles whereas crystalline precipitates often consist of faceted particles. Ageing of such a solution usually leads to agglomeration of the primary particles to form densely packed agglomerates. The agglomerates often have a fairly narrow size distribution and tend to be spherical in the case of amorphous precipitates where there is no ordering force such as a dipole moment or a difference in the surface energy between the crystal facets of the primary particles. Agglomerates as large as 1 micron in diameter can be obtained There are several reports of methods for the preparation of cerium oxide that depend on an increase in pH to cause precipitation. Matjevic and Hsu [see MATIJEVIC and W. P. HSU, *J. Colloidal Interface Sci.*, 118 (1987) 506–523] obtained non-spherical crystalline particles of $CeO(CO_3)$ $_2H_2O$ by precipitation with urea. Aiken et al [see AIKEN, W. P. HSU and E. MATIJEVIC, *J. Am. Ceram. Soc.*, 71 (1988) 845–85] used the same method to obtain spherical particles of a mixed Y(III)/Ce(III) compound. Akinc and Sordelet (see AKINC and D. SORDELET, *Advanced Ceramic Materials*, 2 (1987) 232–238) prepared non-spherical well-crystallised CeOHCO$_3$ particles. Chen and Chen (see CHEN and I. W. CHEN, *J. Am. Ceram. Soc.*, 76 (1993) 1577–1583] used hexamethylenetetramine decomposition to prepare cerium oxide powders and compared them with those precipitated with ammonium hydroxide.

Heating the solution to force hydrolysis has been reported by several authors. Briois et al [see BRIOIS, C. E. WILLIAMS, H. DEXPERT, F. VILLAIN, B. CABANE, F. DENEUVE and C. MAGNIER, *J. Mat. Sci.*, 28 (1993) 5019–5031] reported the preparation of 3 nm particles of CeOSO$_4$H$_2$O from Ce(IV) sulphate at 90° C., but this is not an attractive precursor for cerium oxide due to the presence of the sulphate group.

Hydrothermal conditions appear more suitable for the direct preparation of cerium oxide. Hirano and Kato [see HIRANO and E. KATO, *J. Am. Ceram. Soc.* 79 (1996) 777–780] obtained fine cerium oxide from Ce(III) nitrate, Ce(IV) sulphate and Ce(IV) ammonium sulphate solutions at 180° C. under autogenous pressure. Stable suspensions of well crystallised cerium and cerium oxide doped with 6 at % Y were hydrothermally synthesised at temperatures up to 300° C. by Yang and Rahman [see YANG and M. N. RAHAMAN, *J. Eur. Ceram. Soc.*, 17 (1997) 525–5353].

The homogenous precipitation results cited above, which all depend on forced hydrolysis to cause precipitation succeed in controlling agglomerate morphology and yield agglomerates with a narrow size distribution. However, in the case of precipitation by increase of pH, the agglomerates are densely packed and because the primary particles tend to be strongly bound together by surface forces, the resulting agglomerates are not easily redispersed. Hydrothermal treatment is generally more successful in producing weakly-agglomerated and well-crystallised powders, but the crystallite size tends to be considerably larger. These results demonstrate that powder characteristics are sensitively dependent on the method of preparation so that, in principle, there is considerable scope to try to engineer the powder properties to suit a particular application. Uniformly-sized crystallites smaller than 5 nm, or loosely-bound agglomerates have been produced with the methods mentioned above, but obtaining both characteristics in one powder with them has been difficult to achieve. Forced hydrolysis by increase of pH or temperature is the common factor in these methods, and if it is this that restricts the range of powder properties that can be achieved, then alternative precipitation chemistries are required to provide better routes to weakly-agglomerated nanoscale powders.

It is an object of the present invention to address at least some of the problems associated with methods of homogeneous precipitation known in the art.

Accordingly, in a first embodiment, the present invention provides a process for inducing homogeneous precipitation of a metal oxide, wherein said metal is capable of existing in at least two cationic oxidation states, which process comprises the steps of, (i) providing an aqueous solution of a metal in a lower cationic oxidation state and, (ii) adding an oxidant capable of oxidising said metal to a higher cationic oxidation state under conditions such that the mixing of said aqueous solution and said oxidant is substantially complete before precipitation of an oxide of said metal in its higher oxidation state occurs.

The precipitation process of the present invention may include the further step of isolating the resultant precipitate by, for example, filtration, sedimentation, electrophoresis or centrifugation. The process may also further include the steps of washing and drying the isolated precipitate.

It is necessary for mixing to be substantially complete before oxidation sufficient to result in precipitation of said metal oxide has occurred because this means that precipitation is delayed until a homogeneous mixture is formed. This ensures that homogeneous precipitation results.

Preferably, the metal oxide which precipitates out of solution is a product of hydrolysis of the metal in its higher cationic oxidation state. Metal ions in their higher cationic states have a greater charge density than those in their lower cationic oxidation state are therefore frequently more susceptible to in hydrolysis in aqueous solution.

Metal hydroxides, hydrated metal oxides, metal oxohydroxides, and metal oxoperoxohydroxides (herein referred to collectively as "metal oxides") are commonly the products of metal cation hydrolysis.

It will be appreciated by a person skilled in the art that the metal may be selected from many metals which are capable of existing in at least two cationic oxidation states. Preferably, the metal is selected from Ce or Fe. Ce can exist in the +III and +IV oxidation states whilst Fe can exist in the +II and +III oxidation states.

The counter-ion to the metal in its lower oxidation state may be any inorganic anion which provides a soluble salt of the metal in its lower oxidation state. Preferably, the counter-ion is selected from one or more of nitrate, chloride, sulphate, phosphate, fluoride, bromide, and iodide. Most preferably the counter-ion is a nitrate ion because nitrate ions invariably confer high aqueous solubility on their metal salts.

It will be appreciated by those skilled in the art that the concentration of the aqueous solution of said metal in a lower cationic oxidation state will depend on the identity of the metal ion and its counter-ion and possibly also on the identity of the oxidant used in the process. However, in a preferred embodiment the aqueous solution of said metal in a lower cationic oxidation state is of a concentration in the range of from 0.01 to 1.0 mol/l, preferably 0.05 to 0.2. More preferably, the aqueous solution of said metal in a lower cationic oxidation state is of a concentration of approximately 0.1 mol/l.

It will also be appreciated by those skilled in the art that a number of suitable oxidants may be used to effect oxidation of the metal from its lower cationic oxidation state to its higher cationic oxidation state. Preferably, the oxidant is present as a solution in a water-miscible solvent, more preferably as an aqueous solution. In a particularly preferred embodiment, the oxidant comprises hydrogen peroxide. Hydrogen peroxide is particularly preferred because it does not contaminate the end product with additional anion species. More preferably, the oxidant comprises an aqueous solution of from 3% to 50% hydrogen peroxide in water. In a still more preferred embodiment the aqueous solution of an oxidant comprises approximately 30% hydrogen peroxide in water. Potassium permanganate is another possible oxidant. Preferably, potassium permanganate is added as an aqueous solution.

When hydrogen peroxide is used as the oxidant the metal oxide which precipitates out of solution may have the general formula $M(OH)_{x-y}OOH_y$ wherein x is equal to the oxidation state of the metal cation M and $y \geq 1$. For example, when the metal in its lower oxidation state is $Ce^{3+}$ and the metal in its higher oxidation state is $Ce^{4+}$ the metal oxide which precipitates out of solution has the general formula $Ce(OH)_{4-y}OOH_y$ wherein $y \geq 1$.

It will be appreciated by those skilled in the art that a number of suitable methods may be used to reduce the rate oxidation of the metal from its lower cationic oxidation state to its higher cationic oxidation state. However, in a preferred embodiment the rate of oxidation is slowed by cooling the aqueous solution of said metal in a lower cationic oxidation state and/or the oxidant (hereinafter referred to as the reactants) prior to mixing. More preferably, both reactants are cooled to a temperature in the range of from −10° C. to 10° C. prior to mixing. Even more preferably, both reactants are cooled to a temperature in the range of 0 to 5° C. prior to mixing.

The process of the present invention is distinguished from the prior art in that precipitation is induced by a change in oxidation state of the cation and not by an increase in pH or temperature.

Advantageously, the homogeneous precipitation process comprises the additional step of adding hydroxide ions to the mixture of the reactants so as to substantially complete the precipitation process. Preferably, said hydroxide ions are provided by the addition of aqueous ammonium hydroxide. Preferably the ammonium hydroxide has a concentration in the range of from 5 to 33 vol %, more preferably approximately 25 vol %.

The homogeneous precipitation process of the present invention, including the step of adding hydroxide ions, provides metal oxides which are suitable precursors for the generation of weakly agglomerated nanocrystalline powders of said metal oxides. Accordingly, in a second embodiment, the present invention provides a process for the preparation of a weakly agglomerated nanocrystalline powder of a metal oxide, which process comprises the steps of, i) inducing homogeneous precipitation of said metal oxide by a process as hereinbefore described in the first embodiment including the additional step of adding hydroxide ions to the mixture of the first and second solutions so as to substantially complete the precipitation process, ii) isolating the precipitate.

Preferably, the process includes the further step of subjecting the isolated precipitate to hydrothermal treatment.

The process may also include the further steps of washing and drying the resultant precipitate.

Step ii) may be achieved, for example, by filtration, sedimentation, electrophoresis or by use of a centrifuge.

Preferably, said hydrothermal treatment comprises heating the precipitate in an autoclave in the presence of water at a temperature of from 100 to 300° C., more preferably, at a temperature of from 150 to 200° C., most preferably, at a temperature of approximately 180° C.

As stated above the pressure used for the hydrothermal treatment is that sufficient to prevent boiling of the water. This will obviously depend upon the temperature. At lower temperatures, i.e. up to 220° C., sufficient pressure may be generated by the vapour pressure of the water in the sealed vessel, i.e. from 5 to 50 bar. At higher temperatures, i.e. greater than 220° C., pressure may need to be applied, i.e. up to 150 bar.

The present invention also includes within its scope a metal oxide produced by the homogeneous precipitation process as hereinbefore described in the first embodiment.

The present invention also includes within its scope a weakly agglomerated nanocrystalline powder of a metal oxide produced according to a process as hereinbefore described in the second embodiment.

Preferably, the metal oxide or weakly agglomerated nanocrystalline powder of a metal oxide has a mean particle size in the range of from 2 from 10 nm with a geometric standard deviation, $\sigma_g$, less than or equal to 1.2. More preferably in the range of from 2 to 5 nm with a geometric standard deviation, $\sigma_g$, less than or equal to 1.1.

Particularly preferred metal oxides, and particularly preferred weakly agglomerated nanocrystalline powders of a metal oxide, are those which comprise cerium (IV) oxide.

The present invention also includes within its scope a glass, a polishing medium for glass, a thin surface film, a phosphor, an oxygen storage material or a catalyst material which has been manufactured by a process which uses a weakly agglomerated nanocrystalline powder of a metal oxide produced according to a process as hereinbefore described in the second embodiment.

In a particularly preferred embodiment of the present Len invention, a nanocrystalline powder of cerium oxide is prepared from aqueous cerium (III) nitrate solution by a two-stage precipitation process which yields weakly-agglomerated powders with a crystallite size smaller than 5 nm. In this embodiment a 30% aqueous solution of hydrogen peroxide is added to an aqueous solution of cerium nitrate at 5° C. to slowly oxidise $Ce^{3+}$ to $Ce^{4+}$ and thereby initiate homogeneous precipitation of 3–4 nm primary particles and the formation of dense spherical agglomerates. The precipitation process is completed by the addition of ammonium hydroxide which disrupts the spherical agglomerates leaving a weakly-agglomerated powder of hydrated cerium oxide. The process is completed by hydrothermal treatment at 180° C.

Precipitation is therefore induced by a change in oxidation state of the cation and not by an increase in pH or temperature. The product of the reaction is believed to be $Ce(OH)_3OOH$ and not $Ce(OH)_4$ which is otherwise obtained when ammonium hydroxide alone is used as the precipitating agent.

The present invention will be further illustrated with reference to the following examples and comparative examples The starting materials used in the following examples were: cerium nitrate hexahydrate ($Ce(NO_3)_3.6H_2O_2$, anal., Alfa-Johnson Matthey), hydrogen peroxide (30% $H_2O_2$, p.a., Merck) and ammonium hydroxide ($NH_4OH$, 25 vol % p.a., Merck).

Three synthesis routes, referred to as methods A, B and C, were used for preparation of cerium oxide powder as described below.

Method A (Comparative Examples A1 and A2)

Ammonium hydroxide was added dropwise to a stirred solution of 0.1 mol/l Ce(III) nitrate in water until a solution pH of 10 was reached. A white or yellowish gel-like precipitate was formed which settled rapidly. A sample of the gel-like initial precipitate was prepared for analysis by taking a portion of the reaction mixture, decanting the solution and washing the precipitate twice with a double volume of distilled water and then drying at 80–85° C. overnight (Example A1). The remainder of the product, i.e. supernatant+precipitate, was hydrothermally treated at 180° C. for 4 hours under autogenous pressure without stirring to obtain cerium oxide. After cooling, the clear solution was decanted and the yellowish precipitate was washed with about 200 ml distilled water and then dried at 80–85° C. overnight (Example A2)

Method B (Examples B2 and B3 are Comparative)

A solution of 0.1 mol/l Ce(III) nitrate in water was mixed with 30 vol % hydrogen peroxide in a volume ratio of 3 parts Ce(III) nitrate to 1 part hydrogen peroxide at various temperatures: at about 5° C. (Example B1), at room temperature (Example B2), and a solution which was mixed at RT and then heated to boiling temperature (Example B3). An orange-yellow transparent sol appeared in all cases: after 8–10 minutes at 5° C. and after 2–3 minutes at RT, or on heating to boiling point. The sol produced at 5° C. and aged at that temperature for 12 h was stable at room temperature for more than one week without any settling of the solid phase. In contrast, solids produced at room temperature and by heating to boiling partially sedimented. The precipitated solid particles (Examples B1, B2 and B3) were separated by centrifugation for further examination.

Method C

Separate solutions of 0.1 mol/l Ce(III) nitrate in water and of 30 vol % hydrogen peroxide were cooled to 5° C. and then mixed together under constant stirring. After 8–10 minutes the solution turned first yellow then orange-yellow, but remained transparent, and a sol was formed. Ammonium hydroxide solution was then added to increase the pH value to 10. Above a pH of 9–9.2 the pH increased only slowly in response to further addition of ammonium hydroxide solution and an orange precipitate settled rapidly from solution. Precipitation therefore occurred in two stages. The solution was decanted and the precipitate was washed and dried at 80–85° C. (example C1) or hydrothermally treated (example C2) as described under method A (example A2) above.

Samples of the powders synthesised by methods A, B and C were calcined in air to 300° C. and 500° C. in alumina crucibles at a heating rate 2° C./min with a dwell time of 1 h at temperature.

The precipitated cerium oxide precursors and calcined products were characterised using several techniques known to those skilled in the art to determine particle size, composition and morphology.

Differential thermal analysis and thermogravimetric analysis (DTA/TG, Netsch STA 409) were conducted in a ilu dry-air atmosphere using a heating rate of 2° C./min.

Samples for transmission electron microscopy (TEM, Philips EM 400) of the precipitated cerium oxide precursors were prepared by dipping carbon-coated copper grids into a dilute water suspension of the particles immediately after synthesis. The grids were then dried at room temperature or at 80–85° C. The calcined product was dispersed in absolute ethyl alcohol by ultrasonification (3–5 min) and a drop of a suspension was allowed to evaporate on the grid at room temperature. X-ray diffraction analysis (XRD, Philips PW173) was used to determine phase composition and to estimate the crystallite size of the powders. A $2\theta$ range of 5–80° was used and the apparent crystallite size was estimated from peak broadening using the Scherrer equation: $D_{app}=K\ \lambda/(B\ \cos\theta)$, where K=0.9 and B=peak width obtained using a Voigt peak fitting routine. $CuK_a$ radiation with a graphite filter was used ($\lambda$=1.5406) and the instrumental broadening was determined using a $LaB_6$ standard.

The precipitates produced by the 3 different methods differed significantly, primarily due to the presence of different anion species (—OH in method A, —OOH in method B, or —OH+—OOH in method C) and to the reaction temperature used.

The use of ammonium hydroxide alone (method A) resulted in voluminous white or yellowish gel-like precipitate from Ce(III) nitrate solution. In principle the precipitate should be $Ce(OH)_3$, which is white and is a definite compound rather than a hydrous oxide. Oxidation of $Ce^{3+}$ to $Ce^{4+}$ in solution has been suggested at high pH, i.e. $Ce^{3+}+H_2O \rightarrow Ce(OH)^{3+}+H^++e^-$ with subsequent hydrolysis to $Ce(OH)_4$ and precipitation. However, oxidation of $Ce(OH)_3$ also occurs readily in air at room temperature to form yellow $Ce(OH)_4$. $Ce(OH)_4$ is a hydrous oxide which can also be described as $CeO_2.2H_2O$ which dehydrates progressively i.e. $CeO_2.nH_2O$ where $n \leq 2$. The product of precipitation with ammonium hydroxide is therefore likely to be $CeO_2.nH_2O$ rather than $Ce(OH)_3$.

Precipitation from Ce(III) nitrate using hydrogen peroxide alone (method B) resulted in a fine solid which formed faster at boiling temperature (example B3) than at 5° C. (example B1) or at room temperature (example B2). The stability of the solid solution, as defined by the first appearance of settled solid, was more than 1 week for solid produced at 5° C., and a few minutes for solid produced at boiling temperature. Hydrogen peroxide alone was not capable of precipitating all cerium ions from solution Complete precipitation of cerium ions was achieved using hydrogen peroxide+ammonium hydroxide (method C). The orange-yellow precipitate was formed by a two step process, first the initiation of hydrolysis and complexation with hydrogen peroxide followed by quantitative precipitation with ammonium hydroxide to a pH of about 10. The precipitate settled rapidly and it was easily separated from solution. The precipitates were stable in water but the dry precipitate slowly transformed to crystalline cerium oxide in air at room temperature.

Cerium oxide was identified in the X-ray diffraction spectra of all the powders. The peaks in the spectra of powders precipitated by ammonia alone (method A) were narrow and well-defined with a high signal-to-noise ratio; those of the other powders were all much broader and less intense. Peak broadening may be attributed to small crystallite size and apparent crystallite sizes were calculated as shown in table 1. The cerium oxide powder derived from the —OH (method A) and —OOH+—OH (method C) precipitates by hydrothermal treatment (examples A2 and C2) were both weakly agglomerated, but the powder from mixed ligand precipitation had a significantly smaller apparent crystallite size (4.2 nm compared with 26.8 nm).

Information about the chemical composition of the precipitates was deduced from the thermogravimetric weight loss measurements by comparing measured values with the theoretical weight losses for plausible decomposition reactions e.g. the decomposition of hydrated oxide i.e., $CeO_2.2H_2O$ to $CeO_2$ should result in a weight loss of 17.29%. The XRD spectra indicated that $CeO_2$ was present in all samples, but the additional presence of amorphous $Ce(OH)_4/CeO_2.nH_2O$ could not he excluded.

The precipitate obtained by method A (addition of ammonium hydroxide alone) after drying overnight at 80–85° C. (example A1) showed a weight loss of 6.2% and a weight loss of 3.1% after hydrothermal treatment (example A2), as shown in FIGS. 1A and 1B. These weight losses are lower than those corresponding to the decomposition of $Ce(OH)_3$ (9.95%) or $Ce(OH)_4/CeO_2.2H_2O$ (17.3%) and indicate that the samples consisted either of a partially hydrated form of cerium oxide,. i.e. $Ceo_2.nH_2O$, for which a 6.2% weight loss on decomposition corresponds to n=0.59, or that it consisted of a mixture of phases e.g. $CeO_2+CeO_2.2H_2O$. A weak exothermic peak at about 280° C., which might correspond to the crystallisation of anhydrous cerium oxide, was clearly present in FIG. 1A, but was scarcely evident in FIG. 1B for the hydrothermally treated sample.

Figure 2:
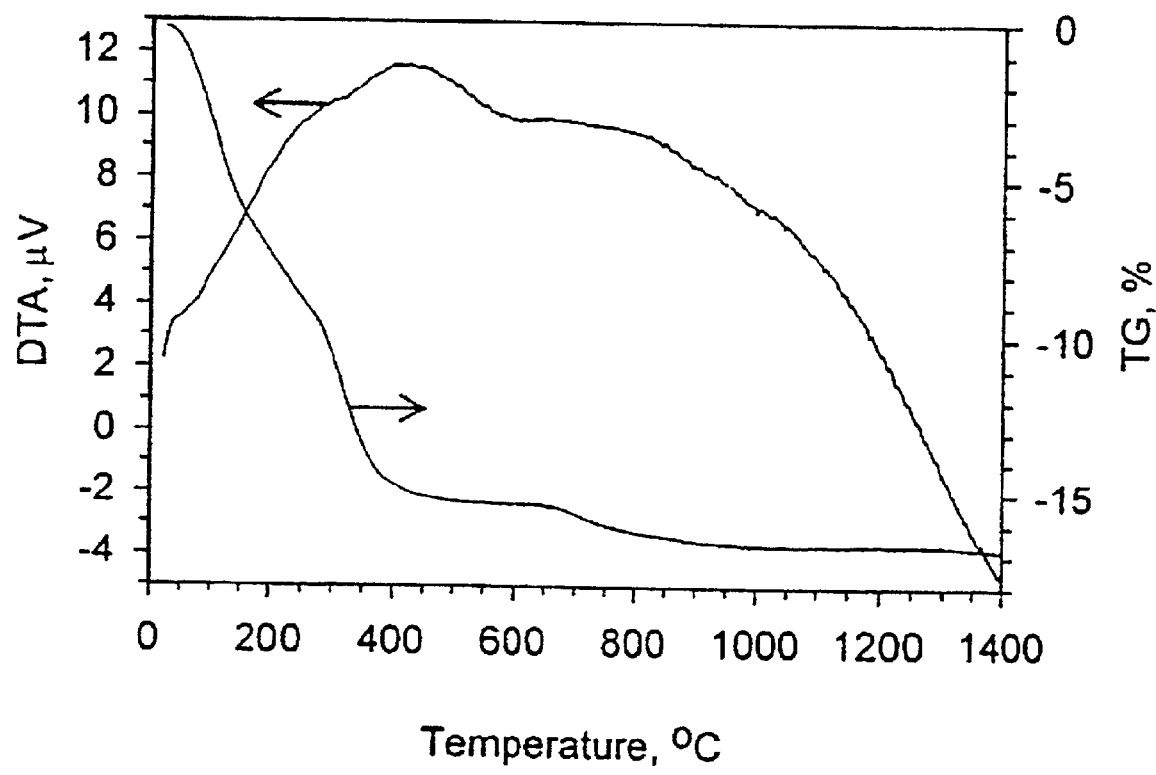

The precipitate obtained by method B (precipitation with hydrogen peroxide alone) showed a total weight loss of 16.8% for the precipitation procedure carried out at boiling point as shown in FIG. 2. This total weight loss corresponds well with that expected for Ce(OH)$_4$/CeO$_2$.2H$_2$O decomposition (17.3%). The general shape of the weight loss curve was similar to that in FIGS. 1A and 1B, i.e. the decomposition appeared to occur in 3 distinct stages and was not complete until >800° C., but the DTA curve did not show the exothermic peak at 280° C. that was observed in FIG. 1A.

Figure 3:
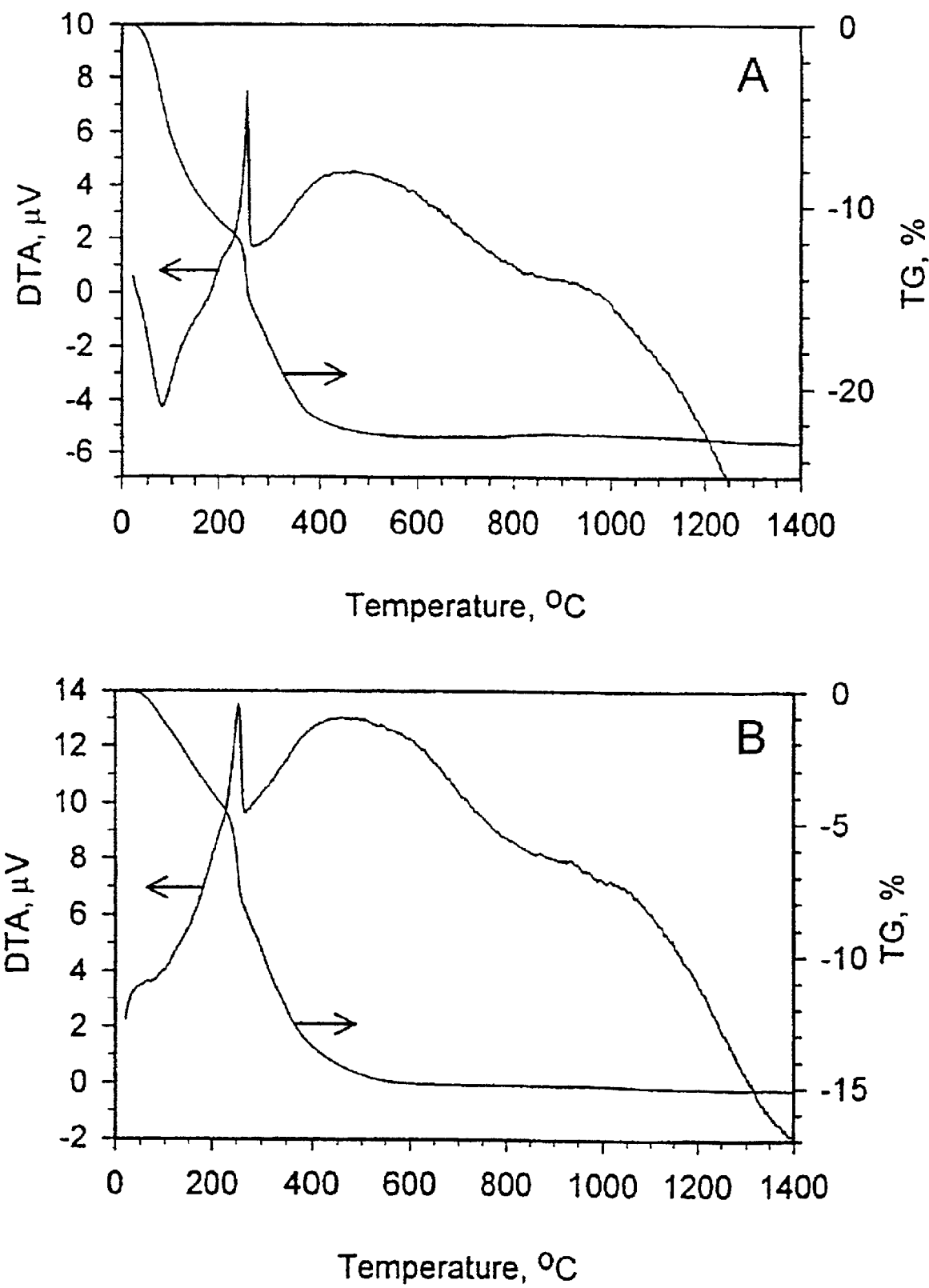

The precipitate obtained by method C (precipitation with hydrogen peroxide followed by ammonium hydroxide) at 5° C. showed a total weight loss of 23.0% as shown in FIG. 3 which corresponds closely to that expected for the decomposition of Ce(OH)$_3$OOH (23.2%) assuming that a single chase was initially present. The DTA curve in FIG. 3A showed two well-defined events. The first event produced an endothermic peak at about 80° C., which might be due to dehydration, or it might correspond to the transformation; Ce(OH)$_3$OOH→Ce(OH)$_4$/CeO$_2$.2H$_2$O, with a theoretical weight loss of 7.1%. The second event generated a well-defined exothermic peak at 250–280° C. which might correspond to the crystallisation of CeO$_2$ occurring at a slightly lower temperature than in the case of that obtained with method A (see FIG. 1A). After ageing freshly-prepared precipitate for 4 h at 100° C. the TG weight loss was 15.1% which does not correspond to the decomposition of any single compound and would be consistent with the presence of a mixture of species due to the complete decomposition of the initial phase e.g. of Ce(OH)$_3$OOH to Ce(OH)$_4$/CeO$_2$.2H$_2$O and the partial decomposition of CeO$_2$.2H$_2$O to CeO$_2$.nH$_2$O where n<2. The DTA curve in FIG. 3B was consistent with the interpretation of the TG curve given above i.e. it no longer showed an endothermic peak at 80° C. and the exothermic peak at 250–280° was still present but was slightly less intense compared with that for the precipitate prepared at 5° C.

Figure 4:
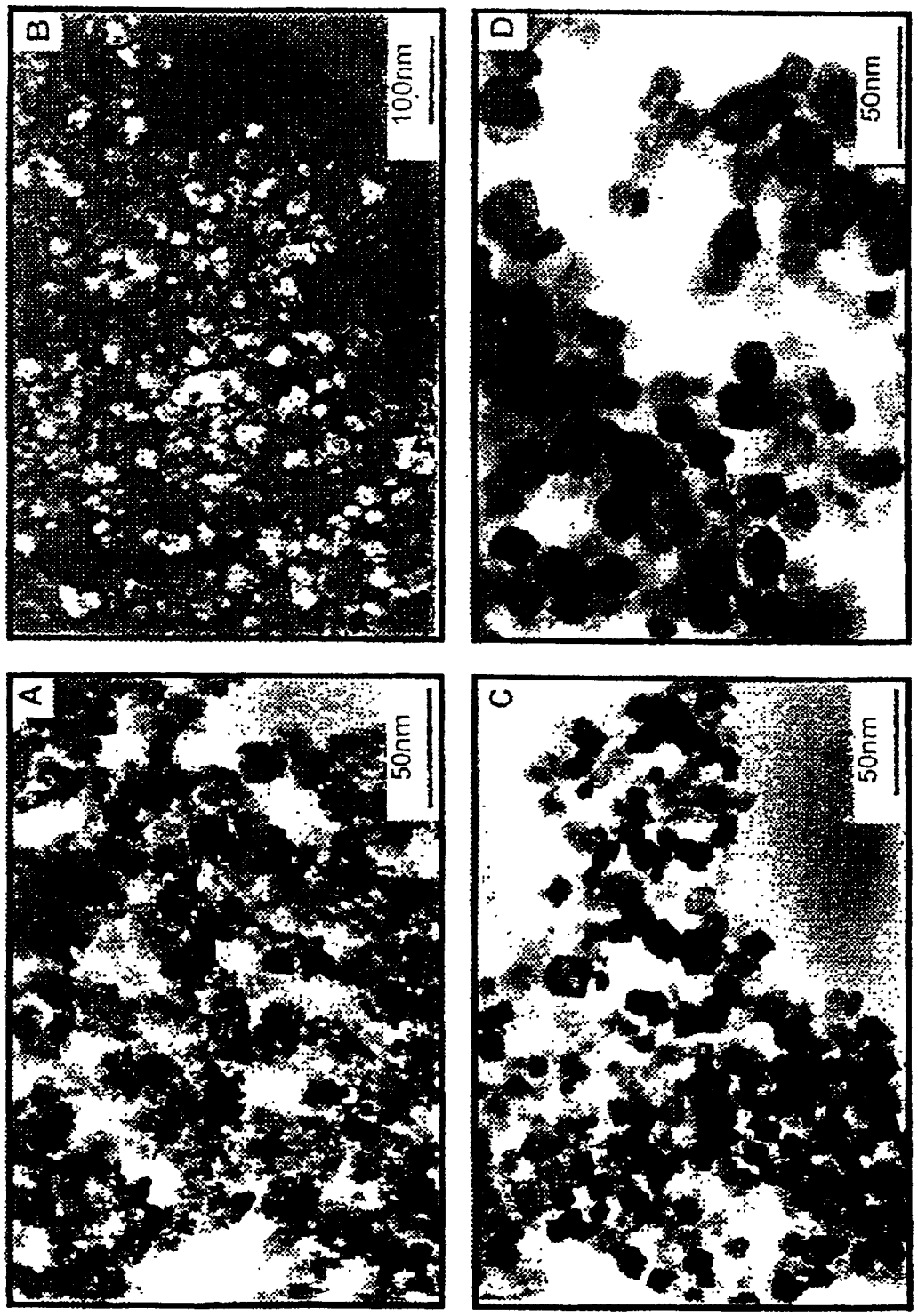

TEM analysis provided information on the size and shape of primary particles and their state of agglomeration. The general morphology of the particles precipitated by ammonium hydroxide (method A) is shown in FIG. 4A. The precipitate consisted of non-uniform agglomerates of equiaxed crystallites approximately 3–4 nm diameter. On calcination there was considerable grain coarsening and the agglomerates were hard and non-dispersable FIG. 4B. Hydrothermal treatment of the hydroxide precipitate resulted in non-agglomerated uniform cubic crystallites 15–20 nm in diameter as shown in FIG. 4C. The hydrothermally treated powder exhibited considerable coarsening of crystallite size after calcination for 1 h at 300° C., FIG. 4D.

Particles obtained by precipitation with hydrogen peroxide (method B) at room temperature (example B2) consisted of dense agglomerate of crystallites 3–4nm in diameter as shown in FIGS. 5A and 5B. Crystallisation of cerium oxide could be observed under the electron beam during TEM examination. FIGS. 5C and 5D shows particles produced by precipitation with hydrogen peroxide at 5° C. (example B1). The crystallites were slightly smaller at 2–3nm than in the sample precipitated at room temperature. FIGS. 5E and 5F show particles precipitated by hydrogen peroxide at 85° C. (example B3). The densely-packed equiaxed agglomerates of 50–100 nm diameter that were obtained are typical of agglomerates formed during homogeneous precipitation and consisted of randomly oriented primary crystallites of 3–4 nm i.e. similar in size to those precipitated at RT. Crystallite size coarsened considerable on calcination. Sharply-facetted crystallites as large as the agglomerates were observed after 1 h at 300° C.—FIG. 5G.

Figure 6:
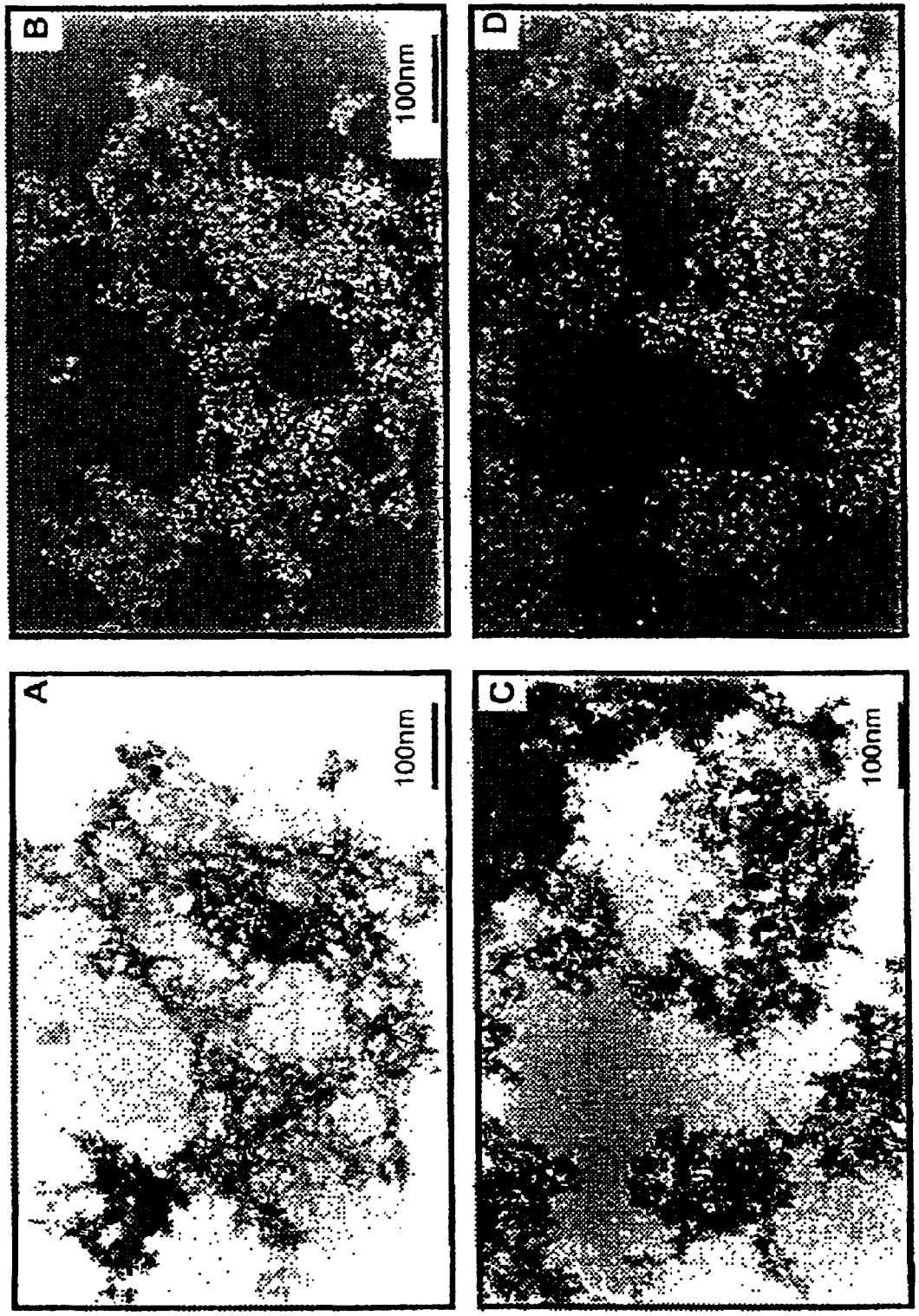

Particles from the two-stage precipitation at 5° C. with hydrogen peroxide and ammonium hydroxide (method C) are shown in FIGS. 6A and 6B for powder dried at 120° C. for 2 h. The agglomerate structure was much less densely packed than in the samples precipitated with H$_2$O$_2$ alone and consisted of randomly-oriented uniform crystallites 5–8 nm in diameter. The powder obtained from this sample after hydrothermal treatment (example C2)is shown in FIGS. 6C and 6D. The crystallites were uniform and about 5 nm in diameter and appeared to be loosely agglomerated. After calcination for 1 h at 500° C. there was very little change in crystallite size.

The reference product was powder produced by method A i.e. the precipitation of cerium hydroxide from Ce(III) nitrate by the addition of ammonium hydroxide. The XRD spectra of the precipitate dried at 80° C. (example A1) showed that the product consisted of well-crystallised CeO$_2$ and TG weight loss measurement indicated it to be slightly hydrated, so that a transformation must have occurred on drying the powder e.g.:

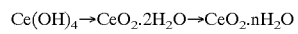

$$Ce(OH)_4 \rightarrow CeO_2.2H_2O \rightarrow CeO_2.nH_2O$$

This method yielded agglomerates with a wide size distribution and which were hard and non-dispersible after calcination and therefore not suitable for further processing. However, hydrothermal treatment of the wet precipitate (example A2) yielded weakly-agglomerated cubic crystallites that were suitable for further processing. The crystallite size was 15–20nm in size according to TEM images and about 27 nm according to XRD peak broadening. The hydrothermal treatment therefore solved the problem of hard agglomerates with this material, but at the expense of considerable crystal growth. In contrast, method C yielded a weakly-agglomerated powder which was not subject to crystal growth during hydrothermal treatment and which had a crystallite size of about 5 nm according to XRD measurement and which appeared somewhat smaller in TEM images, although the image magnification was too low for an accurate measurement.

A key feature of the method C was to mix together hydrogen peroxide and cerium (III) nitrate solution as a temperature low enough to prevent immediate reaction e.g. about 5° C. Maintaining the solution at a constant low temperature ensured that subsequent precipitation occurred homogeneously and that a stable sol formed.

The composition of the dried sol particles precipitated with H$_2$O$_2$ alone (method B) as deduced from TG was Ce(OH)$_4$/CeO$_2$.2H$_2$O (measured weight loss 16.8%, theoretical weight loss=17.3%). Precipitation of a hydroxide in an acidic solution seems unlikely, but it could form during the drying procedure due to the limited stability of lanthanide peroxides. The crystallite size of about 3 nm is also an indication that the precipitation mechanism differed form that with ammonium hydroxide which yielded crystallites about 5 times layer. The role of the peroxo ligand during precipitation may have been to reduce the crystallite growth rate by changing the surface properties or morphology of the particles.

Figure 5:
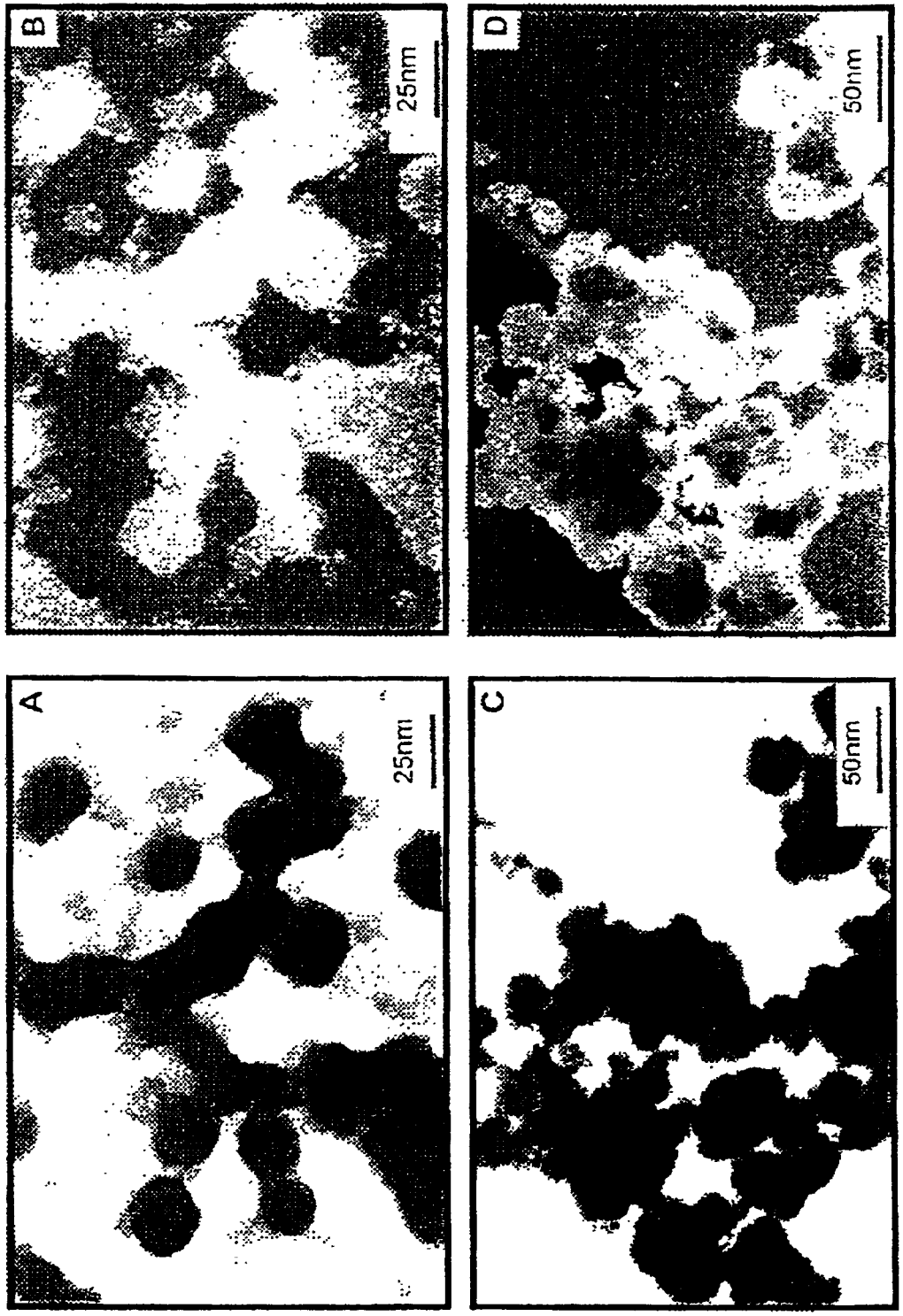
Figure 5:
Figure 5:
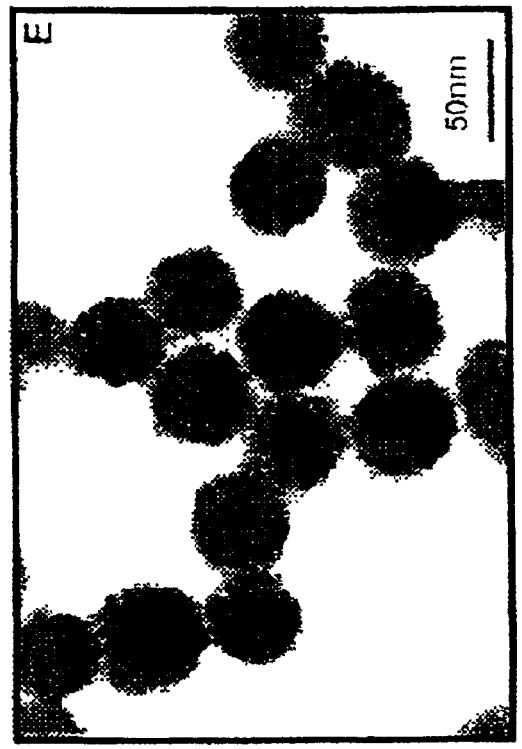
Figure 5:
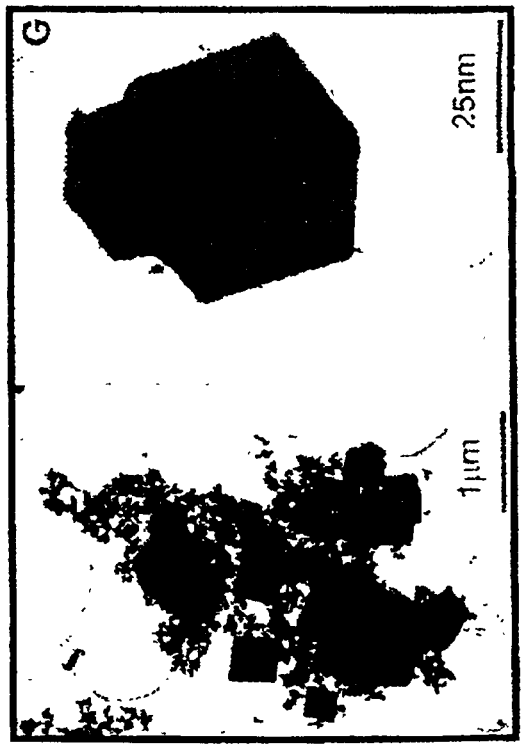

Addition of ammonium hydroxide to the sol (method C) resulted in further precipitation of cations from solution to yield an orange precipitate for which a composition of Ce(OH)$_3$OOH was deduced from TG (measured weight loss=23%, theoretical weight loss=23.2%). This was the composition deduced for the dried product but, given the uncertainty about the stability of the lanthanide peroxides, it may be more appropriate to describe the precipitate that formed in solution by the general formula Ce(OH)$_{4-x}$OOH$_x$ with x≧1 for the precipitate formed at 5° C. The x=1 composition appeared to be stable enough to withstand drying at 80° C. but dad not withstand 4 h at 100° C. The use of ammonium hydroxide in the second stage of method C not only completed the precipitation process of method B but also disrupted the dense agglomerates formed by $H_2O_2$ precipitation as can be seen by comparing FIG. 5 and FIG. 6. Loosely-agglomerated powder should be less subject to crystallite growth on calcination in proportion to the reduced number of contact points between crystallites. Crystallite growth was insignificant during hydrothermal treatment of samples precipitated with hydrogen peroxide and ammonium hydroxide, and the crystallite size remained under 5 nm. In samples precipitated with ammonium hydroxide alone, crystallite size almost doubled to over 25 nm under the same conditions. It is difficult to attribute the suppression of crystallite growth during go *hydrothermal treatment to the continued presence of the peroxo group, which is believed to be unstable at the temperatures used i.e. 180° C. The addition of ammonium hydroxide in method C therefore appears to be an important factor in the prevention of hard agglomerates which might otherwise transform to single crystals on heating as shown in FIG. 5G. Crystallites smaller than 5 nm were reported previously only in the case of precipitation of $CeOSO_4 \cdot H_2O$ from Ce(IV) sulphate solution. In contrast to the nitrate group, the sulphate group is not easily decomposed on calcination, and sulphate is therefore generally not acceptable in a cerium oxide precursor.

The method of inducing homogeneous precipitation by the oxidation of the cation to a higher valence state with an increased hydrolysability, in this case Ce(III)/Ce(IV), is also applicable to other materials e.g. Fe(II)/Fe(III). An advantage of using of hydrogen peroxide a an oxidising, complexing and precipitating ligand is that it does not contaminate the end product with additional anion species.

The weakly-agglomerated state of the cerium oxide powder, the uniform crystallite size of under 5 nm, and the absence of deleterious anion impurities are characteristics which make the powder suitable for a variety of ceramic forming processes and applications.

Powders precipitated by the new two-Stage method are significantly more weakly agglomerated as well as having a smaller crystallite size i.e. less than 5 nm.

TABLE 1

Crystallite size of cerium oxide powders calculated from XRD peak broadening (Scherrer equation)

| Sample preparation parameters | | | Crystallite size (nm) after thermal treatment | | |
|---|---|---|---|---|---|
| Example | Temp | Autoclaved | 12 h at 80–85° C. | 1 h at 300° C. | 1 h at 500° C. |
| A1 | RT | no | 15.4 | 15 | 27 |
| A2 | RT | yes | 26.8 | 27 | 26 |
| B3 | 100° C. | no | 3.2 | 4.4 | — |
| C1 | 5° C. | no | 3.4 | 5.2 | 13 |
| C2 | 5° C. | yes | 4.2 | 4.5 | 10 |

What is claimed is:

1. A process for inducing homogeneous precipitation of a metal oxide, wherein said metal is capable of existing in at least two cationic oxidation states, which process comprises the steps of:
   (i) providing an aqueous solution of a metal in a lower cationic oxidation state, and
   (ii) adding an oxidant capable of oxidizing said metal to a higher cationic oxidation state under conditions such that the mixing of said aqueous solution and said oxidant is substantially complete before precipitation of an oxide of said metal in its higher oxidation state occurs, wherein the rate of oxidation is reduced by cooling the aqueous solution of said metal in a lower cationic oxidation state and/or the oxidant prior to mixing.

2. A process as claimed in claim 1, wherein the aqueous solution of said metal in a lower cationic oxidation state and the oxidant are cooled to a temperature in the range of from −10 to 10° C. prior to mixing.

3. A process as claimed in claim 2, wherein the aqueous solution of said metal in a lower cationic oxidation state and the oxidant are cooled to a temperature in the range of from 0 to 5° C. prior to mixing.

4. A process as claimed in claim 1, wherein the metal oxide which precipitates out of solution is a product of hydrolysis of the metal in its higher cationic oxidation state.

5. A process as claimed in claim 1, wherein the oxidant is added as an aqueous solution.

6. A process as claimed in claim 1, wherein the metal is selected from Ce or Fe.

7. A process as claimed in claim 1, wherein the aqueous solution of said metal in a lower cationic oxidation state comprises nitrate as a counter-ion.

8. A process as claimed in claim 1, wherein the aqueous solution of said metal in a lower cationic oxidation state is of a concentration in the range of from 0.01 to 1.0 mol/l.

9. A process as claimed in claim 1, wherein the aqueous solution of said metal in a lower cationic oxidation state is of a concentration of approximately 0.1 mol/l.

10. A process as claimed in claim 1, wherein the oxidant comprises hydrogen peroxide.

11. A process as claimed in claim 10, wherein the metal salt or oxide has the general formula $M(OH)_{x-y}OOH_y$ wherein X is equal to the oxidation state of the metal cation M and $y \geq 1$.

12. A process as claimed in claim 10, wherein the metal in its lower oxidation state is $Ce^{3+}$, the metal in its higher oxidation state is $Ce^{4+}$ and the metal oxide which precipitates has the general formula $Ce(OH)_{4-y}OOH_y$ wherein $y \geq 1$.

13. A process as claimed in claim 1, comprising the additional step of adding hydroxide ions to the reaction mixture so as to substantially complete the precipitation process.

14. A process as claimed in claim 13, wherein said hydroxide ions are provided by the addition of ammonium hydroxide.

15. A process as claimed in claim 1, comprising the further step of isolating the precipitate.

16. A process as claimed in claim 15, comprising the further step of washing and drying the isolated precipitate.

17. A process for the precipitation of a weakly agglomerated nanocrystalline powder of a metal oxide, which process comprises the steps of:
   (i) inducing homogeneous precipitation of said metal oxide by a process according to claim 13; and
   (ii) isolating the precipitate.

18. A process as claimed in claim 17, which further comprises the step of subjecting the precipitate to hydrothermal treatment.

19. A process as claimed in claim 17 comprising the further step of washing and drying the precipitate.

20. A process as claimed in claim 18, wherein said hydrothermal treatment is at a temperature of from 100 to 300° C.

21. A process as claimed in claim 18, wherein said hydrothermal treatment is at a temperature of approximately 180° C.

22. A process as claimed in claim 17, wherein said precipitate comprises a weakly agglomerated nanocrystalline powder of a metal oxide having a mean particle size in the range of from 2 to 10 nm with a standard geometric deviation in the particle size less than or equal to 1.2.

23. A process as claimed in claim 17, wherein said precipitate comprises a weakly agglomerated nanocrystalline powder of a metal oxide having a mean particle size in the range of from 2 to 5 nm with a standard geometric deviation in the particle size less than or equal to 1.1.

24. A process as claimed in claim 23, wherein said metal oxide comprises cerium oxide.

* * * * *